March 16, 1926.
E. T. FERNGREN
CUTTING APPARATUS
Filed June 12, 1922  3 Sheets-Sheet 1
1,576,734
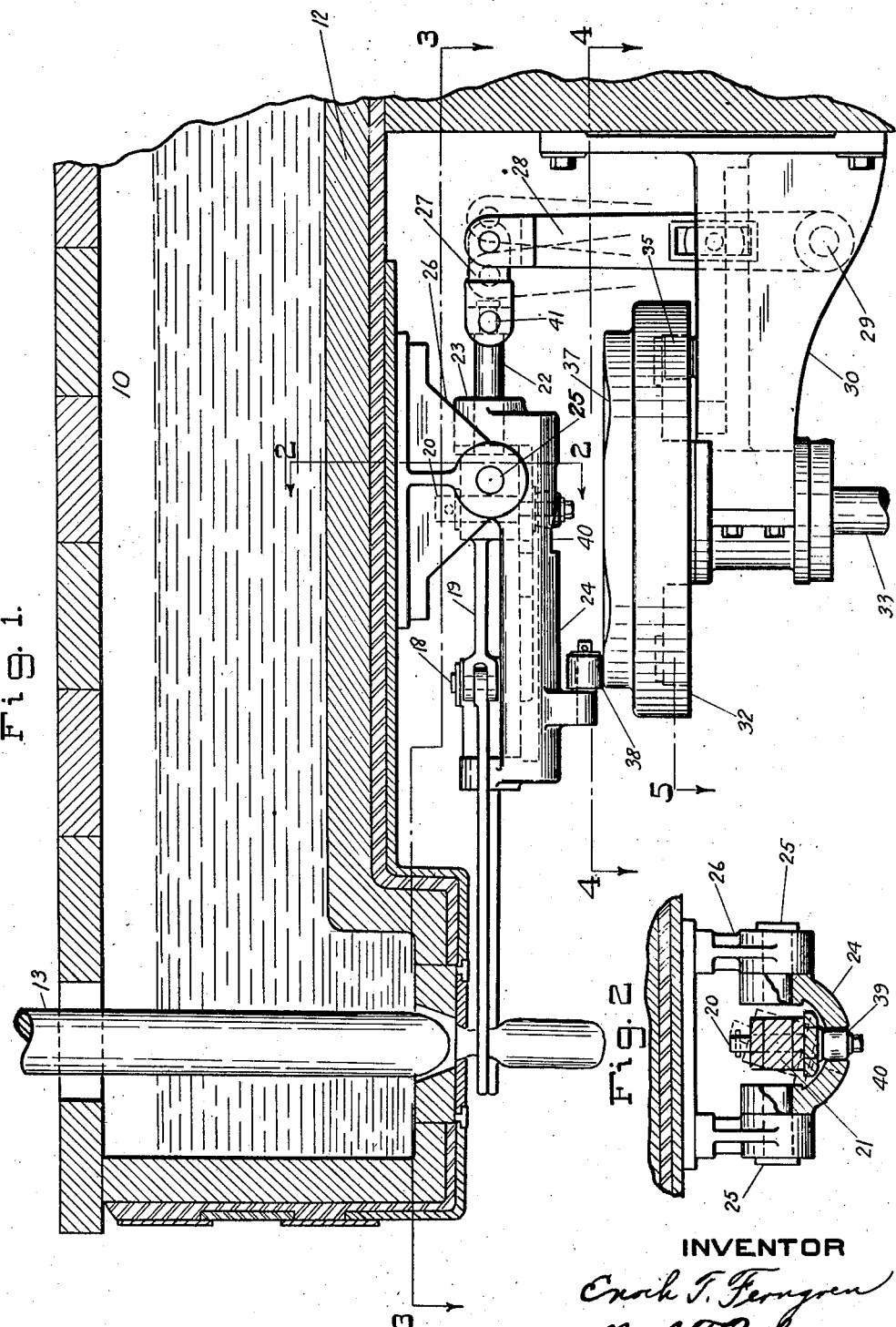
INVENTOR March 16, 1926.  
E. T. FERNGREN  
1,576,734  
CUTTING APPARATUS  
Filed June 12, 1922  
3 Sheets-Sheet 2
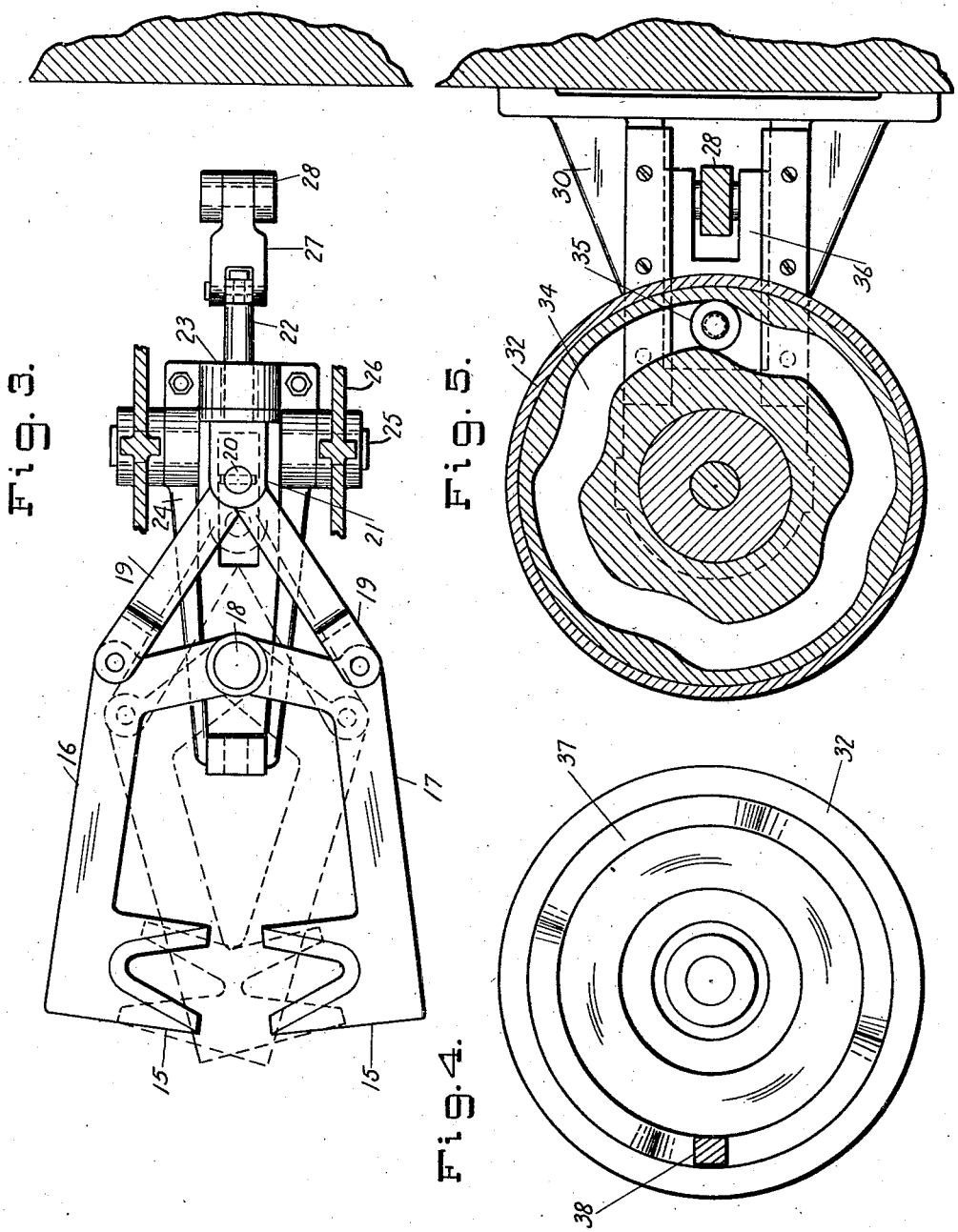
INVENTOR  
Enoch T. Ferngren  
BY J. F. Rule  
Attorney March 16, 1926.

E. T. FERNGREN 1,576,734

CUTTING APPARATUS

Filed June 12, 1922   3 Sheets-Sheet 3

INVENTOR
Enoch T. Ferngren
BY
His attorney.

Patented Mar. 16, 1926.

1,576,734

UNITED STATES PATENT OFFICE.

ENOCH T. FERNGREN, OF TOLEDO, OHIO, ASSIGNOR TO THE OWENS BOTTLE COMPANY, OF TOLEDO, OHIO, A CORPORATION OF OHIO.

CUTTING APPARATUS.

Application filed June 12, 1922. Serial No. 567,518.

*To all whom it may concern:*

Be it known that I, ENOCH T. FERNGREN, a citizen of the United States, residing at Toledo, in the county of Lucas and State of Ohio, have invented new and useful Improvements in Cutting Apparatus, of which the following is a specification.

My invention relates to cutting apparatus particularly designed for severing molten or plastic glass as it issues from an outlet orifice, to form individual charges or gobs.

With the usual forms of shears or cutters at present used for such purpose, in which the blades approach horizontally from opposite directions and shear the glass, there is a tendency for the lower blade to throw the upper end of the severed glass to one side so that it does not drop in a straight vertical line. There is also a tendency for the upper blade to push the remaining stub of glass to one side so that the lower end of the gob is more or less distorted.

An object of the present invention is to overcome the above objections and provide a severing means in which the tendency to throw the glass to one side is overcome.

Other objects of the invention will appear hereinafter.

In the accompanying drawings:

Figure 1 is a sectional elevation of an apparatus embodying the principles of my invention.

Figure 2 is a section at the line 2—2 on Figure 1.

Figure 3 is a sectional plan at the line 3—3 on Figure 1.

Figure 4 shows a shear operating cam, being a section at the line 4—4 on Figure 1.

Figure 5 is a section at the plane indicated by the line 5 on Figure 1.

Figure 6:
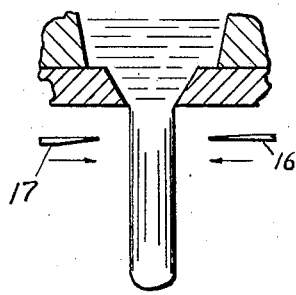
Figure 7:
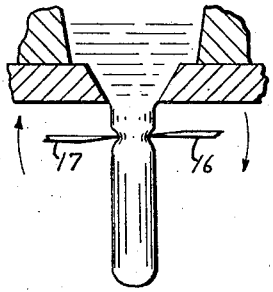
Figure 8:
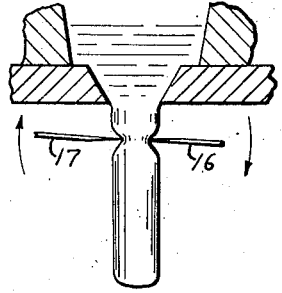
Figure 9:
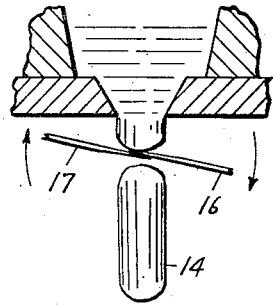
Figure 10:
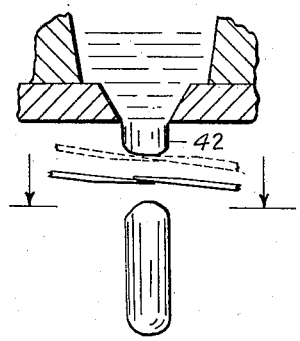
Figure 11:
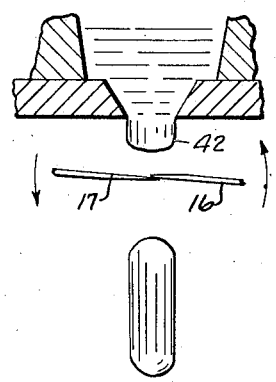

Figures 6 to 11 inclusive are diagrammatic views showing successive steps in the operation of the shears. Figure 6 shows the shear blades approaching the glass for the severing operation. Figure 7 shows the blades at the commencement of the cut. Figure 8 indicates the initial tilting of the blades. Figure 9 shows the tilted blades at the completion of the severing stroke. Figure 10 indicates the bodily movement downward of the blades after the cut. Figure 11 indicates the reverse tilting movement of the cutters while in said downward position.

Molten glass 10 issues from an outlet orifice 11 in the bottom of a container 12 which may be the usual furnace boot or extension, the discharge of glass being controlled by a periodically reciprocated regulating plug or valve 13. This plug operates in a well known manner to assist in expelling the glass as the plug moves downward, thereby forming a suspended gob 14. The upward movement of the plug serves to retard or interrupt the flow.

The suspended gob 14 is automatically severed by a pair of shear blades having V-shaped cutting edges 15 at the outer ends of shear arms 16 and 17. These arms are fulcrumed on a pivot pin 18. A pair of links 19 are connected at their forward ends to the arms 16 and 17 and at their rear ends are pivoted to a vertically disposed pivot pin 20 mounted in a head 21. A stem 22 on said head extends rearwardly therefrom through a bearing 23 at the rear end of a tilting carrier or support 24. The carrier 24 is provided with trunnions 25 having bearings in hangers 26 attached to the bottom of the boot. A link 27 pivoted to the stem 22 is connected to the upper end of a lever 28, the lower end of which is fulcrumed at 29 in a stationary bracket arm 30.

A cam disk 32 is fixed to the upper end of a vertical shaft 33 journalled to rotate in the arm 30. The under surface of the cam disk is formed with a cam slot 34 in which runs a cam roll 35 on a cam block 36 mounted to reciprocate horizontally in the bracket 30. The slide block 36 has an operating connection with the lever 28. The rotation of the cam disk operates through the block 36 to oscillate the lever 28, thereby imparting a forward and rearward reciprocating movement to the head 21. This operates through the links 19 to reciprocate the shear blades about their fulcrum 18.

The cam disk 32 has a cam surface 37 on which runs a cam roll 38 carried by the carrier 24 for rocking said carrier about the axis of its trunnions 25, whereby an up and down movement is imparted to the cutters between the positions indicated in full and broken lines in Figure 10.

In addition to the movements above described, provision is made for imparting a lateral rocking or tilting movement to the blades about a horizontal axis intersecting the vertical axis of the gob or line of flow, said horizontal axis being parallel with the longitudinal movement of the rod 22. For this purpose the pivot rod 20 carries a cam roll 39 running in a cam slot 40 formed in the support 24, said slot being formed to impart a twisting or rocking movement to the head 21 about the axis of the stem 22 as the shears advance. A universal joint connection 41 is provided between the link 27 and stem 22 to permit this rocking movement. The rocking of the head 21 imparts said rocking movement to the shears.

The operation may be summed up as follows:

The cam disk 32 is rotated continuously. The cam 34, therefore, reciprocates the lever 28 which operates through the rod 22 and links 19 to close and open the shears. The cutters approach the glass horizontally, as shown in Figure 6. At about the time they commence their severing operation the cam 40 commences to tilt the cutters in the direction indicated by the arrows on Figure 7. This tilting continues during the severance of the glass (Fig. 8) so that when the cutters have completed their cutting stroke they are in the tilted position shown in Figure 9. It will be noted that the upper blade 16 is in an upwardly and forwardly inclined position, so that its forward movement tends to push the upper end of the gob to the left or to carry it with the blade. This counteracts the tendency of the lower blade to throw the upper end of the gob to the right, namely, in the direction in which the blade is moving. The tilting movement of the blades, therefore, counteracts their tendency to push the end of the gob to one side, so that the gob is permitted to drop vertically into the receiving mold which is ordinarily provided directly beneath it. The knives are also given a short downward movement, preferably after the cutting stroke is completed, from the dotted to the full line position (Fig. 10). The cutters thus follow the downward movement of the glass and are immediately separated from the stub of glass 42 which remains after the cut. Chilling of this stub by the shears is thus prevented or reduced to a minimum and overheating of the shears by the glass is also prevented. The shears are also tilted back to horizontal position, as indicated by the arrows (Fig. 11) before or during their initial opening movement.

It will be understood that the timing of the several cam controlled movements relative to each other may be varied within certain limits to meet varying conditions found in practice. Thus, the downward tilting of the shears may be effected earlier or later relative to the cutting stroke by rotatively adjusting the cam 37 relative to the cam 34. The cams, as shown, are shaped to impart four complete cutting operations during each complete rotation of the cam disk. These operations are, of course, synchronized with the movements of the regulator 13.

Variations may be resorted to within the spirit and scope of my invention.

What I claim is:

1. In glass severing apparatus, the combination of shears, means to move said shear horizontally for cutting, and means to tilt them during the cutting stroke in the same direction about a common horizontal axis perpendicular to their direction of cutting movement.

2. In glass severing apparatus, the combination of shears, means to move said shears horizontally for cutting, means to impart a tilting movement to them during the cutting stroke about a horizontal axis perpendicular to their direction of cutting movement, and means to impart a downward movement to the cutters at the completion of the cutting stroke.

3. The combination of a pair of cutter blades, means to move said blades horizontally toward each other into severing relation, and means to impart to the blades during the cutting stroke, a tilting movement about a horizontal axis perpendicular to their direction of movement to cutting position, so that the upper blade is moved from a horizontal to an upwardly and forwardly inclined position.

4. In apparatus for severing a vertical column or stream of plastic glass, the combination of cutter blades, means to cause said blades to approach from opposite directions and sever the glass, and automatic means to impart to the blades during the cutting stroke a tilting movement about the same horizontal axis perpendicular to their direction of severing movement.

5. In apparatus for severing a vertical column or stream of plastic glass, the combination of cutter blades, means to cause said blades to approach from opposite directions and sever the glass, automatic means to impart to the blades during the cutting stroke, a tilting movement about a horizontal axis perpendicular to their direction of severing movement, and means to move said shears bodily downward while in severing position.

6. The combination of a pair of cutter blades having V-shaped cutting edges, means to cause said blades to approach a vertical column or stream of glass from opposite directions and sever the glass, and means to tilt the blades from a horizontal to an inclined position about a horizontal axis intersecting said column and perpendicular to said directions, after the severance of the glass has commenced and before the blades have been withdrawn from cutting position.

7. The combination of a pair of cutter blades having V-shaped cutting edges, means to cause said blades to approach a vertical column or stream of glass from opposite directions and sever the glass, means to tilt the blades from a horizontal to an inclined position during the severance of the glass, and means to move the blades bodily downward before they are again separated.

8. In glass cutting apparatus, the combination of a pair of horizontally disposed cutter blades, a carrier on which said blades are mounted, automatic means to periodically actuate said blades and cause them to approach from opposite directions to severing position, automatic means to periodically tilt said carrier about a horizontal axis parallel to the direction in which the cutters approach and thereby impart an up and down movement to the cutters, and automatic means to periodically tilt said cutters about a horizontal axis perpendicular to said first mentioned axis.

9. In glass cutting apparatus, the combination of a pair of cutter blades, a carrier on which said blades are supported, said carrier mounted to tilt about a horizontal axis, a rotary cam operable to tilt said carrier, a second cam operable to move the cutter blades to and from cutting position, and a cam on said carrier operable to tilt said blades.

10. In glass severing apparatus, the combination of a pair of shear blades, means to impart a cutting stroke thereto, and means operable during the cutting stroke to tilt simultaneously both blades about the same horizontal axis perpendicular to their direction of shearing movement.

11. In glass severing apparatus, the combination of a pair of shear blades, means to impart a cutting stroke thereto, and means operable during the cutting stroke, to tilt simultaneously the blades at the same angular speed and through equal angles about the same horizontal axis perpendicular to the direction of their cutting stroke.

12. The combination of means for delivering charges of molten glass from a supply body, shear blades, means for imparting a shearing movement thereto for severing a charge, and means for imparting to said blades during their penetration of the charge, a tilting movement about an axis lying in the plane of penetration, said axis intersecting the charge of glass.

13. The combination of a container for molten glass having an outlet through which the glass issues, means for periodically severing the issuing glass to produce individual masses or charges, said means comprising a pair of shear blades, means to impart a substantially horizontal shearing movement to the blades for severing a charge, means to impart a tilting movement to the blades during the severance of the glass about a horizontal axis extending through the glass at the point of severance, and means to move the shears downward away from contact with the glass above the shears while closed at the instant of separation of the charge.

Signed at Toledo, in the county of Lucas and State of Ohio, this 9th day of June, 1922.

ENOCH T. FERNGREN.